United States Patent Office 3,406,330
Patented Oct. 15, 1968

3,406,330
RELAXATION INVERTER CIRCUITS WITH
SWITCHING CONTROL
Brian Raymond Pelly, Murryville, Pa., assignor to
Westinghouse Brake and Signal Company, Limited
Filed Mar. 8, 1965, Ser. No. 437,737
Claims priority, application Great Britain, Mar. 23, 1964,
12,076/64
12 Claims. (Cl. 321—18)

ABSTRACT OF THE DISCLOSURE

An improvement in an inverter or converter circuit, for generating from a supply source a continuous alternating current in a load circuit, including a storage capacitor, a saturable reactor connected to the storage capacitor and intermittently operable from a high impedance condition to a low impedance condition for charging the capacitor and a resonant output circuit. A second saturable reactor is connected to the storage capacitor and is operable from a high impedance condition to a low impedance condition while the first saturable reactor is in a high impedance condition for providing a discharge path for the unidirectional transfer of charge from the storage capacitor to the resonant output circuit. The improvement also includes means for controlling the condition of the saturable reactors, means for sensing the occurrence of zeros in the waveform of the load circuit and producing signals corresponding thereto and means for applying these signals to the control means to control the switching condition of the saturable reactors and thus maintain coincidence of the operation of the second saturable reactor from a high impedance condition to the low impedance condition with the occurrence of such zeros.

---

This invention relates to inverter circuits and relates in particular to relaxation inverter circuits.

In the complete specification of co-pending United States patent application 349,967 which will hereafter be referred to as the parent specification, there is described and claimed a relaxation inverter circuit arrangement having switching means for intermittently charging a capacitor from a current supply source and switching means intermittently operable to connect the said capacitor to an output circuit for the resonant transfer of energy to the output circuit.

In operation of a circuit in accordance with the above mentioned application and where the last mentioned switching means constitutes means, such as a saturable reactor, which conducts following charging of the capacitor at an instant depending upon the charge on the capacitor, the output waveform of the inverter tends to be dependent upon the voltage to which the capacitor charges.

According to the present invention there is provided an improvement in or modification of the invention claimed in the parent specification comprising an inverter circuit arrangement including means for in operation intermittently charging a storage capacitor from a supply source and switching means intermittently operable to connect the capacitor so charged to a resonant circuit to induce by the discharge of said capacitor into said resonant circuit an output alternating current voltage the frequency of which is higher than the switching frequency of said switching means, and control means for controlling the operation of said switching means to tend to maintain a predetermined phase relationship therebetween and said alternating current voltage.

The basic principle of the proposed improvement or modification is to derive a control signal for controlling the resonant discharge of current of the capacitor, which is proportional to the difference in time between the point at which the output voltage passes through a given zero and the point at which the switching device operates. This has the effect of maintaining the switching frequency of the last mentioned switching device at a reasonably exact sub-multiple of the output frequency of the inverter. In this way the possibility of a beat frequency resulting between the two frequencies is substantially reduced. Hence, even though the output frequency, which is determined at least to some extent by the load, may vary or alternatively the supply voltage to the inverter circuit may vary, thereby causing the switching device in question to operate at a different frequency, the possibility of distortion of the output waveform may be reduced.

Figure 1:
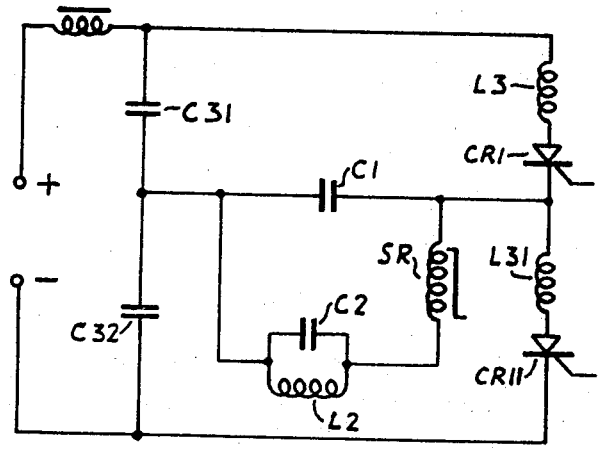
Figure 4:
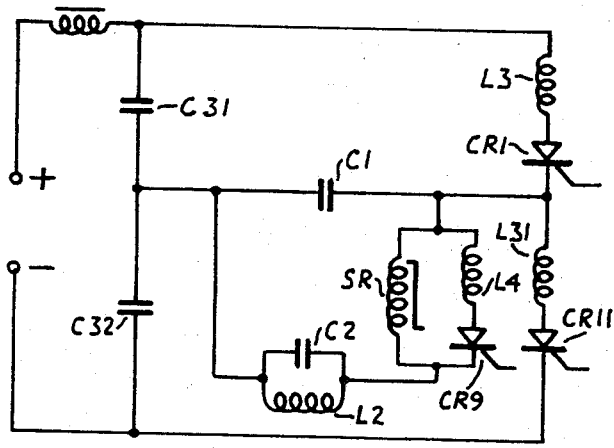
Figure 2A:
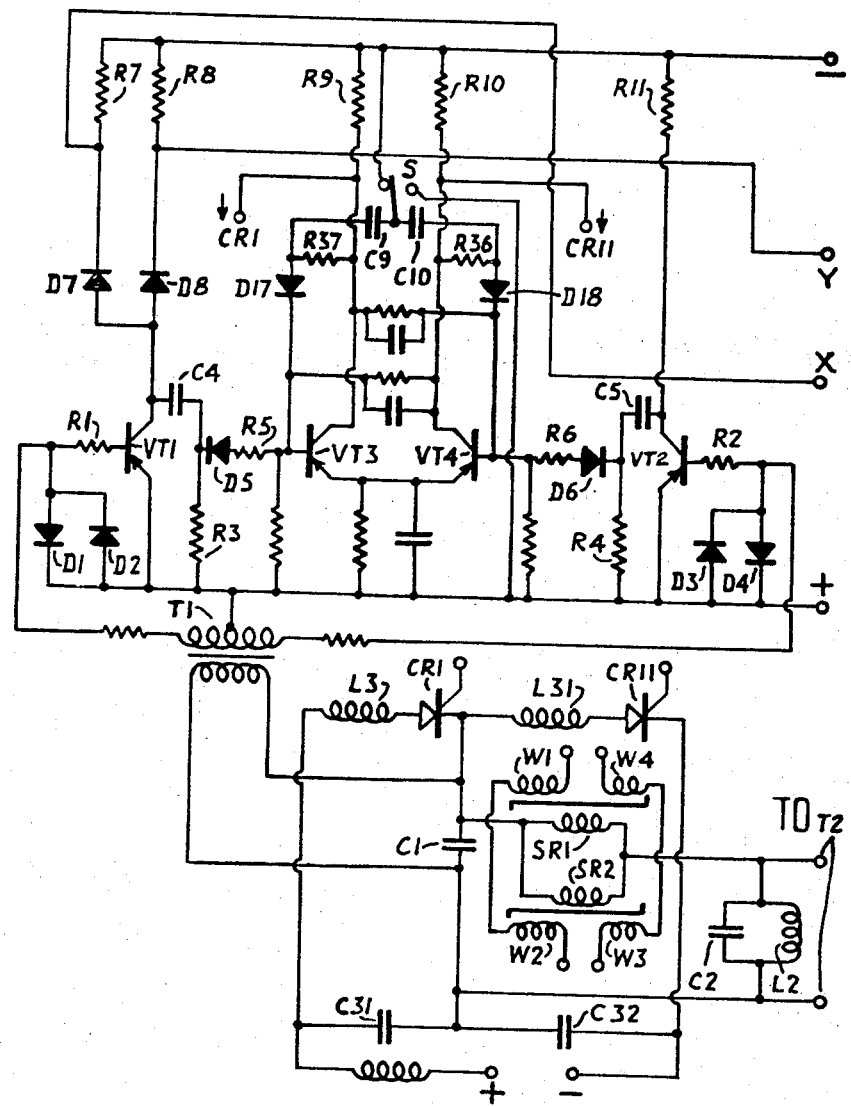
Figure 2B:
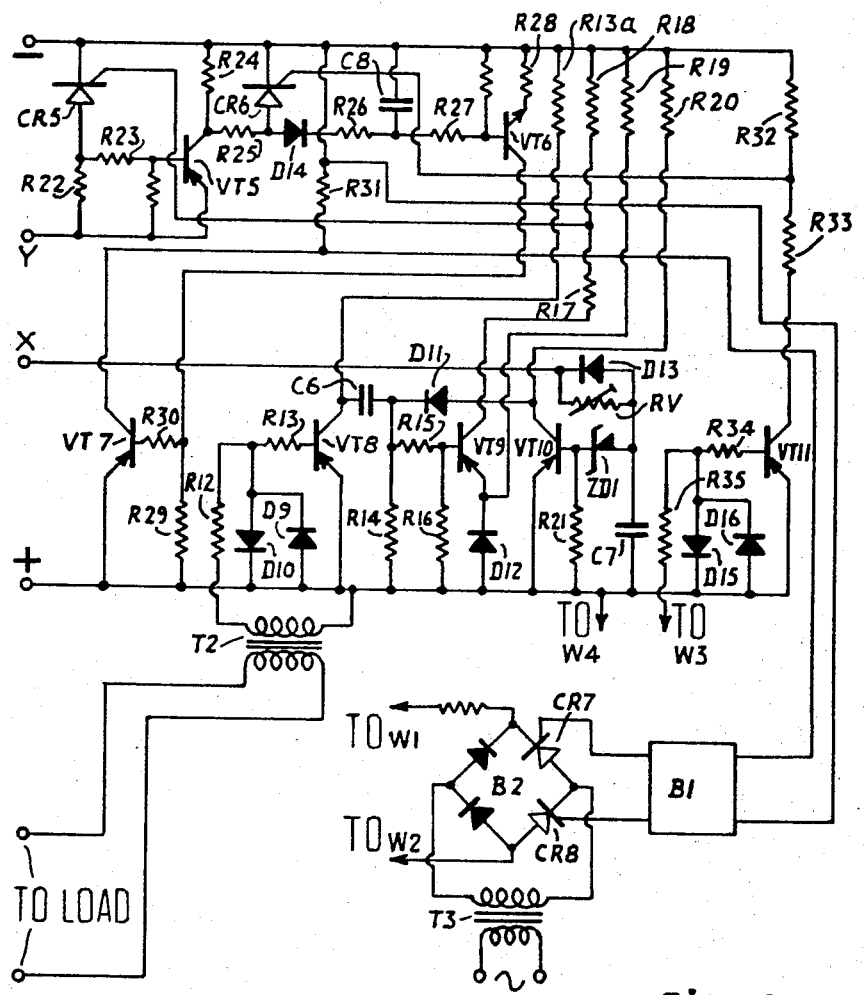
Figure 3:
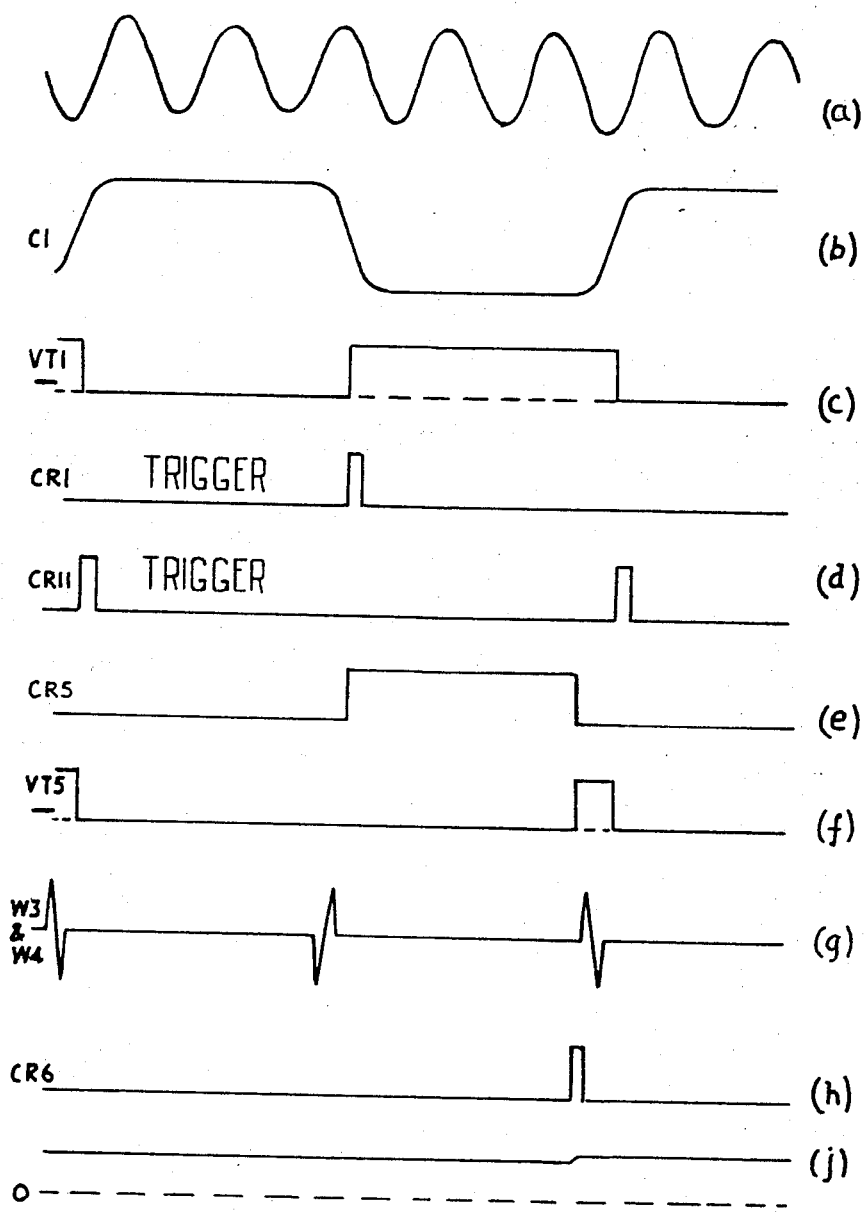

In order that the present invention may be clearly understood and readily carried into effect the same will be further described by way of example, with reference to the accompanying drawings in which:

FIG. 1 illustrates one form of inverter circuit to which the invention may be applied, FIGS. 2a and 2b illustrate a circuit arrangement embodying the invention, FIG. 3 illustrates waveforms which will be referred to in describing the manner of operation of the circuit arrangement of FIGS. 2a and 2b, and FIG. 4 illustrates a modified form of inverter circuit to be referred to hereafter.

The circuit arrangement shown in FIG. 1 is an inverter circuit substantially as already described in the parent specification with reference to FIG. 9 thereof and will not be discussed in great detail herein. However, for the purpose of completeness it may be indicated that a direct current supply source is connected at the terminal marked + and — and this supply is then present across a series arrangement of two capacitors C31 and C32 the junction of these capacitors is connected via a further capacitor C1 to the junction of two arms comprising a controllable rectifier device CR1 and an inductance L3 and a controllable rectifier device CR11 and a further inductance 31. The other terminals of these two arms are connected back to the direct current supply terminals. Across the capacitor C1, there is connected a switching means in the form of a saturable reactor SR in series with a tuned output circuit comprising the capacitor C2 and the inductance L2 in parallel.

In operation of the circuit arrangement of FIG. 1, it must first be understood that he controllable rectifier devices CR1 and CR11 are devices of a type which are rendered conducting on application of triggering signals thereto and are subsequently rendered non-conducting only when the current therein tends to reverse. At the instant when controlled rectifier device CR1 is rendered conducting the capacitor C1 is charged resonantly from the capacitor C31 which had already received charge from the direct current source. At the instant when CR1 becomes non-conducting, C1 is left with its right-hand plate at a potential more positive than the supply positive. The voltage across C1 then appears across the saturable reactor SR and the unsaturated impedance of the latter is sufficiently high to prevent the appreciable discharge of C1 at this time. It may be noted furthermore, that under steady running conditions, the high frequency voltage in the output circuit is superimposed on the blocking voltage presented by SR. After a period to be determined principally by the characteristics of the saturable reactor SR, the latter becomes saturated and the capacitor C1 then discharges into the output resonant circuit in a resonant manner. The voltage on C1 consequently overswings, whilst current continues to flow in SR. When, however, the current through C1 begins to reverse, the current in SR subsequently reduces to zero and SR becomes unsaturated, thereby again presenting a high impedance to prevent substantial discharge at this time of the capacitor C1 in the opposite direction. The controllable rectifier device CR11 is then rendered conducting by the triggering source and the charge on C1 is supplemented by resonant discharge from the capacitor C32 which has also received charge from the direct current supply source. CR11 then again becomes non-conducting. Again, after a time dependent principally upon the characteristic of the saturable reactor SR, the latter becomes saturated to allow C1 to discharge into the resonant output circuit and the sequence of operation is repeated.

It is found that in certain applications of a circuit arrangement such as that illustrated in FIG. 1, instability of operation may occur. This is primarily due to the lack of control of the voltage time integral during which the saturable reactor SR presents a relatively high impedance to the capacitor C1. Thus, as the direct current supply voltage increases for example, so the frequency at which the capacitor C1 is connected across the tuned output circuit also tends to increase and the difference between the latter frequency and the nearest sub-multiple of the tuned output frequency circuit varies such that a beat frequency between the two may occur.

One specific manner of overcoming the above shortcomings as envisaged herein is to replace the saturable reactor SR by two saturable reactors in parallel each having a control winding and the control windings being connected in series opposition. If no current is passed through the control windings, the circuit operates in a similar manner to that described with reference to FIG. 1, the discharge of current from the capacitor C1 being equally shared by the parallel connected primary windings of the saturable reactors. If, however, a direct current is passed through the control windings, it is found that provided this current is less than a predetermined amount the operation of the circuit remains substantially unaltered except that the distribution of the discharge current from the capacitor through the main windings changes. One winding now carries a larger proportion of the positive current pulse and a smaller proportion of the negative current pulse and vice versa for the other winding. At a given critical value of the control current and for values above this, one of the saturable reactors carries the entire positive current pulse and the other the entire negative current pulse. Furthermore, at this critical value the control ampere-turns become substantially equal to the mean ampere-turns of the main winding of either saturable reactor due to the capacitor discharge current pulse. Increase of the control current beyond the said critical value results in a proportional increase in the mean capacitor discharge current such that equality of main winding ampere-turns and control windings ampere-turns is maintained. It may be seen, therefore, that for a given input voltage to the inverter, if the control current to the parallel arrangement of saturable reactors is increased, an increase in the saturable reactor switching frequency is produced and the instant at which the saturable reactor switches may be controlled by varying the control current.

Assuming that the output frequency characteristic of the load which is employed with the inverter circuit is substantially constant, a simple open loop compensation system may be envisaged to ensure stable operation of the inverter over a wide range of input direct current voltages. The control current to the parallel arrangement of saturable reactors may for example be derived from the direct current supply to the inverter through a resistor which is pre-set to give the desired switching frequency of the saturable reactor. In this case, variations in the supply voltage result in the same proportional change in the control and main winding currents and therefore, cannot result in any change in the switching frequency of the saturable reactor. Moreover, since at a constant input voltage, variations in the load on the output circuit cannot alter the area of the capacitor discharge current pulse, because this is determined by the voltage excursion across the capacitor C1 when discharging into the load, which must under steady state conditions be equal to the supply voltage, changes in load cannot produce any change in switching frequency.

Variations in the circuit envisaged in the previous paragraph are clearly possible. For example, the control current to the saturable reactors may be derived from a relatively low voltage lower power rectifier connected by a suitable step-up transformer to an A.C. supply which is rectified to provide the direct current source to the inverter.

When, however, it is desirable to arrange the inverter circuit to cater for a variety of resonant output circuit frequencies, it is preferable to have automatic means for adjustment of the control current to the parallel connected saturable reactors to ensure that the switching frequency of the saturable reactors is correctly adjusted in relation to that of the output circuit. One such arrangement is shown in FIGS. 2a and 2b when placed together. The underlying principle of this system is to derive a direct current control signal for supply to control windings of the saturable reactors arranged as described above which is proportional to the difference in time between the point at which the output voltage waveform passes through a given zero and the point at which the saturable reactor switches to discharge the capacitor C1 into the output circuit. The control signal to the saturable reactors is applied with such a sense as to tend to maintain an insignificant delay between the output voltage zero and the switching point of the saturable reactor.

Referring to FIGS. 2a and 2b, the same references are used to denote the various components in the inverter circuit as are previously used in FIG. 1, except that the saturable reactor SR is now replaced by two saturable reactors connected in parallel and denoted as SR1 and SR2. The saturable reactors are provided with respective control windings W1 and W2 which are connected in series opposition and two further windings W3 and W4 which are also connected in series and serve to provide indications of instants at which the saturable reactors become conducting. Connected across the capacitor C1 there is a primary winding on a transformer T1, the secondary winding of which is centre tapped and connected between the base feeds to respective transistors VT1 and VT2 via resistors R1 and R2 as shown. The respective junctions of R1 and R2 with the terminals of the secondary winding of T1 are connected via respective opposite poled pairs of diodes D1, D2 and D3, D4 to the positive supply line for the transistors to which the emitter electrodes thereof are connected. Associated with the collector electrodes of VT1 and VT2 there are differentiating circuits comprising capacitors C4 and C5 and corresponding resistors R3 and R4. The outputs of these differentiating circuits are connected via respective diodes D5 and D6 and resistors R5 and R6 to the base electrodes of two further transistors VT3 and VT4. Diodes D5 and D6 are so poled as to only permit the passage of negative going pulses to the bases of VT3 and VT4 and the latter two transistors are cross connected via respective resistance and capacitance circuits and also have a common emitter circuit. VT3 and VT4 therefore operate as a bistable circuit and pulses derived from the collector electrodes thereof are employed to drive the stages which trigger the controllable rectifier devices CR1 and CR11 in the inverter circuit. The collector electrodes of VT1, VT2, VT3 and VT4 have collector resistors R7, R8, R9 and R10 and R11, R7 and R8 being associated together with VT1 via respective rectifier devices D7 and D8 to provide output connections X and Y to the part of the circuit shown in FIG. 2b.

Across the load circuit comprising C2 and L2, there is connected a primary winding of a further transformer T2 the secondary winding of which is connected via a resistor R12 and a resistor R13 to the base electrode of a further transistor VT8 which has a collector resistor R13a. Again, the junction of R13 and R12 is connected via a parallel opposed pair of diodes D9 and D10. The collector electrode of VT8 is connected via a differentiating circuit formed by capacitor C6 and resistor R14 and a diode D11 to the collector electrode of a further transistor VT10 to be referred to hereafter. In addition, the output of the differentiating circuit just referred to is connected to a potential divider comprising resistors R15 and R16 the junction of which is connected to the base electrode of further transistor VT9. VT9 has its emitter electrode connected via a suitably poled diode D12 to the positive supply line and via a resistor R19 to the negative supply line and the collector electrode of this transistor is connected via two resistors R17 and R18 also to the negative supply line.

The transistor VT10 has a collector resistor R20 and the polarity of the diode D11 is such as to permit VT10 to absorb negative going pulses derived from the transistor VT8 when VT10 is conducting. VT10 is provided furthermore with a base biasing resistor R21 and a Zener diode ZD1 via which the base is connected to capacitor C7. The junction of ZD1 and C7 is connected via a parallel arrangement of a variable resistor RV1 and a diode D13 to the junction of R7 and D7 associated with the transistor VT1, the diode D13 being so poled that when VT1 is non-conducting the upper plate of C7 becomes negatively charged. The junction of the resistors R17 and R18 in the collector circuit of VT9, is connected to the triggering electrode of a controllable rectifier device CR5, included via a resistor R22 between the junction of R8 and D8 and the negative supply line. The junction of R22 and the anode of CR5 is connected via a resistor R23 to the base electrode of a transistor VT5, the emitter electrode of which is connected again to the junction of R8 and D8, the collector electrode of VT5 being connected via a resistor R24 to the negative supply line. The connector electrode of VT5 is further connected via a resistor R25 to the anode of a further controllable rectifier device CR6 the "cathode" of which is connected to the negative supply line, and R25 also being connected via a diode D14 to a smoothing circuit comprising a resistor R26 and a capacitor C8, the junction of which is connected via a further resistor R27 to the base electrode of a transistor VT6. The transistor VT6 is an n-p-n type transistor having its emitter connected via a resistor R28 to the negative supply line and its collector connected via a resistor R29 to the positive supply line. The upper end of R29 is connected via a resistor R30 to the base electrode of a further transistor VT7 which is of p-n-p type and has a collector resistor R31. The terminals of R31 are connected furthermore to provide a control signal to a driver circuit represented by block B1, the outputs of which carry triggering pulses to controllable rectifier devices CR7 and CR8 in a conventional controllable bridge B2 which derives its A.C. input from a transformer T3 the primary winding of which is connected to an alternating current supply. The direct current output from the bridge B2 is connected to supply a direct current control signal to the windings W1 and W2 in series on the saturable reactors SR1 and SR2.

The triggering electrode of the aforementioned controllable rectifier device CR6, is connected to the junction of a pair of resistors R32 and R33 included in the collector lead of a further transistor VT11 the emitter electrode of which is connected to the positive supply line as indicated. The base electrode of VT11 is connected via two resistors R34 and R35 to the series arrangement of windings W3 and W4 on the two saturable reactors SR1 and SR2 and the other terminal is returned to the positive supply line. The junction of R34 and R35 is connected via a pair of oppositely parallel diodes D15 and D16 to the emitter of VT11.

As indicated in the foregoing, the collector circuits of VT3 and VT4 have output connections to pulse output stages which supply the gating electrodes of the controllable rectifier devices CR1 and CR11. The stages are transistor stages which convert the front edge of the voltage transients which occur across the resistors R9 and R10 into pulses for operating the controllable rectifiers and will not be described further herein.

Associated with the cross-couplings on the bistable circuit comprising transistors VT3 and VT4, moreover, there are provided circuit components for the purposes of starting the operation of the inverter; these comprise components D17, C9, C10 and D18 in series between the base electrodes of VT3 and VT4 the junction of C9 and C10 being connected to a movable contact on a two position switch S which can be operated one way or the other to connect this junction either to the positive or negative supply line. Resistors R37 and R36 are provided between the junctions of C9 and D17 and C10 and D18 respectively and the corresponding collectors of the transistors.

In operation of the circuit arrangement shown in FIGS. 2a and 2b it will be assumed that initially the direct current supply is switched on and that neither of the controllable rectifier devices CR1 or CR11 is rendered conducting. On operation of the switch S, the bistable circuit comprising VT3 and VT4, which is in one or other of its stable states, is switched to its opposite state thereby producing an output voltage transient across R9 or R10 with a corresponding triggering pulse via the appropriate pulse output stage (not shown) to the corresponding controllable rectifier device CR1 or CR11. Operation of the inverter is therefore assumed to commence.

Since the primary winding of the transformer T1 is connected across the capacitor C1, when the voltage across the capacitor C1 is negative at its upper plate, the transistor VT1 is rendered conducting and VT2 is rendered non-conducting. When the opposite situation pertains, VT2 is rendered conducting and VT1 is rendered non-conducting. The voltage waveform across the capacitor C1 is illustrated at b in FIG. 3 and the voltage across the collector of VT1 with respect to the negative line is shown at c in FIG. 3. Negative-going pulses therefore appear alternately at the base electrodes of the transistors VT3 and VT4 of the two stage circuit and these pulses appear approximately at the cross-over points of the voltage waveform across the capacitor C1. The appropriate switching of the controllable rectifier devices is thereby effected by the outputs from VT3 and VT4.

The base electrode of the transistor VT8, being coupled via the transformer T2 to the tuned output circuit of the inverter, receives a sample of the output voltage which is shown at a in FIG. 3 and the transistor VT8 is therefore switched alternately to the conducting and non-conducting stages for approximately 180° intervals of the output voltage. Negative-going pulses are therefore developed across the resistor R14 at approximately the cross-over point of the load voltage waveform at 360° intervals. These pulses would be applied always to the base circuit of the transistor VT9, were it not for the existence of the diode D11 which is connected to the collector of VT10 so as to form a by-pass when VT10 is conducting.

Since when VT1 is non-conducting, the upper plate of the capacitor C7 is connected to the negative supply line voltage, during the period immediately following, for which VT1 is rendered conducting as previously indicated, the capacitor C7 is charged to a voltage which is in excess of the breakover voltage on the Zener diode ZD1. The transistor VT10 is thereby rendered conducting. Hence, the negative-going pulses which appear across R14 are sufficiently suppressed by VT10 and D11 to prevent VT9 from being conducting under these conditions. Subsequently to turn-on of VT1, however, and when the voltage across C7 has discharged sufficiently via the resistor RV and the transistor VT1, VT10 becomes non-conducting and the next negative pulse to appear across the resistor R14 switches VT19 into the conducting state. A positive voltage transient is, therefore, applied to the triggering electrode on the controllable rectifier device CR5 and the latter becomes conducting. This places a negative bias on the base electrode of the transistor VT5 which therefore also becomes conducting to place a forward bias on the controllable rectifier device CR6. The voltage waveform appearing across the device CR5 is shown at $e$ in FIG. 3 and the voltage at the collector of the transistor VT5 with respect to the negative supply line is shown at $f$ in FIG. 3.

It will be appreciated that each of the negative going pulses appearing across R14 as referred to earlier corresponds to a zero in the output waveform and by virtue of transistor VT10 such pulses are effectively inhibited for a period depending on the setting of RV via which discharge of the capacitor C7 takes place following turning on of VT1. The saturable reactor SR re-establishes a high impedance condition as soon as C1 finishes a discharge and SR is prevented from switching again for a pediod which is set by RV.

The position reached so far is, therefore, one in which SR1 or SR2 has switched and recovered to its high impedance condition and a forward voltage has been placed across CR6 at a subsequent point of zero voltage on the inverter output waveform.

At the instant when the saturable reactor SR1 or SR2 again switches, there is an output derived via the windings W3 and W4 which is applied to the base circuit of the transistor VT11. At this instant VT11 becomes conducting and applies a triggering signal to the controllable rectifier device CR6 which, therefore, becomes conducting. The period for which CR6 has a forward bias applied to it, therefore, is equal to the time interval which elapses betwen the voltage zero in the output waveform of the inverter at which CR5 was triggered and the instant at which either saturable reactor is again switched. Pulses thus produced across CR6 may be as shown at $h$ in FIG. 3. These pulses are positive going pulses and are transmitted via the diode D14 to the smoothing components R26 and C8 and the smoothed resulting waveform is applied via R27 to the first stage VT6 of an amplifier formed of VT6 and VT7. The driver circuit B1 which is responsive to the output of this amplifier controls the direct current output of the rectifier bridge B2 which is supplied to the control windings W1 and W2 which operate in a sense to tend to reduce the width of the pulses across CR6. The control circuit is thereby so arranged that the switching instants of the saturable reactors tend to occur substantially at zero in the output voltage waveform in the inverter in spite of variations, within limits, of the direct current supply voltage to the inverter or the output frequency or both.

Referring to the circuit arrangement shown in FIG. 4, this circuit arrangement shows an inverter circuit substantially of the type shown in FIG. 1 except that the saturable reactor SR has connected in parallel with it an inductance L4 in series with a further controllable rectifier device CR9. In this circuit arrangement CR9 carries positive discharge current pulses from the capacitor C1 to the load circuit and SR carries the negative pulses. The instant at which C1 is switched across the load circuit in the positive half cycle is therefore determined by the instant at which CR9 is rendered conducting and since the voltage waveform across SR must be symmetrical, this switches at the same relative point for negative half cycles.

The circuit arrangement shown in FIG. 4 is, therefore, assumed to be substituted in the general arrangement of FIG. 2 for the inverter circuit, CR9 being triggered via a coupling transformer from the collector circuit of transistor VT9 to tend to make the switching of the capacitor C1 into the output circuit substantially coincident with zeros in the output waveform as before. In this arrangement the controllable rectifier circuit comprising B2, the driver B1 and the parts of the circuit employing VT11, VT5, CR5, CT6 and VR6 are no longer required and are assumed to be absent in this case.

Means such as provided by the transistor VT10 and its associated components, which enable a number of output cycles to occur for each discharge of C1 into the output circuit, are clearly still desirable in order to enable frequencies not restricted by the turn-off times of the controllable rectifier devices to be obtained.

It is a feature of an inverter circuit as described in the foregoing that a relatively small inductance connected in series with the saturable reactor or equivalent switching means which is provided, results in a substantial reduction in output voltage and this may provide a useful means for regulating the output voltage. For example, the output voltage may be controlled in steps by using a tapped inductance in series with the saturable reactor or alternatively, continuous control of the output voltage may be achieved by using a continuously variable inductor.

Reference has been made in the foregoing to the instability which may occur in an inverter circuit such as shown in FIG. 1 in the absence of certain precautions such as described. With a Q factor in the output circuit of below about 10, the instability may not have any major disadvantage apart from the fact that distortion of the output waveform is produced. However, with higher Q leads, overloading of the controllable rectifiers and other circuit components may result. This is because the voltage level to which the capacitor C1 is charged immediately before the device CR11, for example, is rendered conducting, is sometimes very close to the voltage appearing across the capacitor C32. When CR1 is then rendered conducting, a relatively small pulse of current flows and when CR1 is again switched off, the reverse bias voltage across the device is small. The capacitor C32 is now recharged from the supply and after a time which is too short to allow the controllable rectifier device to acquire again its forward blocking capability, the net voltage across the controllable rectifier swings into a forward direction and it, therefore, immediately begins to carry a further forward current. Shortly afterwards the voltage across C1 reverses due to the saturation of the saturable reactor and the combined voltage across C32 and C1 now appears directly across the inductance L31. CR11 then passes a large surge current and repeated occurrences of such surge currents may lead to destruction of the controllable rectifier devices.

It is an additional feature of the invention that precautions may be taken to reduce the possibility of surges of the type described above occurring in the controllable rectifiers by using an arrangement in the triggering circuits for the controllable rectifiers which inhibits the pulse to a controllable rectifier triggering electrode in the event of a forward blocking voltage across the controllable rectifier being instantaneously too low. Alternatively the inhibiting circuit may be arranged to operate in the event of the voltage across the capacitor C1 being instantaneously too high. Circuit modifications in accordance with this proposal may be made to the arrangement of FIG. 2 and details thereof are not further given herein as means for providing the precaution may be readily apparent to those skilled in the art.

Having thus described my invention what I claim is:

1. In an inverter circuit arrangement including means for in operation intermittently charging a storage capacitor from a supply source and switching means intermittently operable to connect the capacitor so charged to a resonant circuit to induce by the discharge of said capacitor into said resonant circuit an output alternating current voltage the frequency of which is higher than the switching frequency of said switching means, the improvement comprising control means including means for sensing the characteristics of the output voltage waveform and means for controlling the switching operation of said switching means in accordance with said characteristics for maintaining a predetermined phase relationship between said switching operation and said alternating current voltage.

2. An inverter circuit as claimed in claim 1, said control means comprising a sensing circuit for sensing corresponding zeros in successive cycles of the output A.C. voltage waveform, gate means for applying the first such zero occurring after a predetermined delay following a transfer of charge from the capacitor to the resonant circuit to initiate a voltage condition in the circuit, a further sensing circuit for sensing the operation of the switching means to terminate said voltage condition, the control means being operable to adjust the respective operation of the switching means to tend to maintain the duration of said voltage condition to a minimum.

3. An inverter circuit as claimed in claim 1, said control means including a sensing circuit for sensing corresponding zeros in successive cycles of the output A.C. voltage waveform and means responsive to the first such zero occurring after a predetermined delay following transfer of charge from the capacitor to the resonant circuit for initiating an operation of the switching means.

4. An inverter circuit as claimed in claim 3 said sensing circuit comprising a circuit which detects the occurrence of output voltage transients in predetermined sense to produce pulses corresponding thereto and a switching device responsive to said pulses with diversion means operable for the duration of said delay to divert said pulses.

5. An inverter as claimed in claim 4, the delay being effected by a capacitive time storage element discharge of which is initiated on the voltage on the first mentioned storage capacitor changing in a predetermined manner and said diversion means being inoperative when the charge in the delay storage element has reduced to a predetermined level.

6. An inverter circuit as claimed in claim 1 said switching means including a saturable reactor provided with a direct current control winding the magnitude of direct control current therein being variable by the control means to tend to maintain said predetermined relationship between the operation of the switching means and zeros of the output waveform.

7. An inverter as claimed in claim 6, the storage capacitor of the inverter being chargeable alternately in opposite directions and the switching means comprising parallel connected main windings of two saturable reactors respective control windings of which are connected to receive with mutually opposite polarity said direct control current.

8. An inverter circuit as claimed in claim 6, said sensing circuit for sensing the operation of the switching means including a further winding on each saturable reactor to provide an output signal indicative of the occurrence of the low impedance condition thereof.

9. An inverter circuit as claimed in claim 3, the storage capacitor of the inverter being chargeable alternately in opposite directions and the switching means having a controllable rectifier device connected in a path in parallel with a saturable reactor, said control means being connected to adjust the instants of application of triggering signals to the controllable rectifier device.

10. An inverter or converter circuit for generating from a supply source a continuous alternating current in a load circuit including two input terminals and a storage capacitor, first switching means connected to the storage capacitor and the input terminals and intermittently operable from a high impedance condition to a low impedance condition for charging the capacitor from the input terminals, two output terminals and a resonant output circuit connected to said output terminals, second switching means connected to said storage capacitor and to the output terminals and operable from a high impedance condition to a low impedance condition whilst the said first switching means is in a high impedance condition for providing a discharge path for the unidirectional transfer of charge from the storage capacitor to the resonant output circuit, means for controlling the condition of said switching means, the operating frequency of the first and second switching means being lower than the resonant frequency of the resonant output circuit, means for sensing the occurrence of zeros in the waveform in the load circuit and producing signals corresponding thereto and means for applying said signals to said means for controlling the condition of the switching means for maintaining coincidence of the operation of the second switching means from a high impedance condition to the low impedance condition with the occurrence of such zeros.

11. A circuit as claimed in claim 1 said means for controlling the condition of the switching means including a gate circuit and a timing circuit, the timing circuit being connected to control the gate circuit to inhibit the signals corresponding to said zeros for a predetermined time following operation of the second switching means, a time-to-voltage converter circuit responsive to a transmitted output pulse from the gate circuit to produce a control signal dependent upon the time which elapses between said transmitted pulse and the next operation of the second switching means and means for applying the control signal to the second switching means.

12. A circuit as claimed in claim 10, said means for controlling the condition of the switching means including a gate circuit and a timing circuit the timing circuit being connected to control the gate circuit to inhibit the signals corresponding to the said zeros for a predetermined time following operation of the second switching means with means for applying a pulse transmitted by said gate as a control pulse to operate the second switching means.

References Cited

UNITED STATES PATENTS

| 3,058,252 | 10/1962 | Matsuche | 320—1 |
|---|---|---|---|
| 3,139,588 | 6/1964 | Clark et al. | 328—223 |
| 3,218,576 | 11/1965 | Winpisinger | 331—117 |
| 3,218,577 | 11/1965 | Fischman | 331—117 |
| 3,243,729 | 3/1966 | Olson et al. | 331—117 |
| 3,273,077 | 9/1966 | Camenzind | 331—117 |
| 3,290,581 | 12/1966 | Hooper | 331—117 |
| 3,316,476 | 4/1967 | Olson et al. | 321—45 |

JOHN F. COUCH, *Primary Examiner.*

W. M. SHOOP, *Assistant Examiner.*